United States Patent
Miedema (10) Patent No.: US 11,483,369 B1
(45) Date of Patent: Oct. 25, 2022

(54) MANAGING CONFIRMATION CRITERIA FOR REQUESTED OPERATIONS IN DISTRIBUTED MICROSERVICE NETWORKS

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/340,549

(22) Filed: Jun. 7, 2021

(51) Int. Cl.
*H04L 67/01* (2022.01)
*H04L 9/40* (2022.01)
*H04L 67/02* (2022.01)
*G06F 9/54* (2006.01)

(52) U.S. Cl.
CPC .............. *H04L 67/01* (2022.05); *G06F 9/547* (2013.01); *H04L 63/20* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,671,818 B1 * | 12/2003 | Mikurak | H04L 63/08 714/48 |
| 7,130,807 B1 * | 10/2006 | Mikurak | G06Q 30/0202 705/7.31 |
| 7,995,569 B2 | 8/2011 | Ashwood-Smith | |
| 3,364,036 A1 | 1/2013 | Boertjes et al. | |
| 9,060,215 B2 | 6/2015 | Miedema | |
| 9,258,190 B2 | 2/2016 | Swinkels et al. | |
| 9,485,013 B2 | 11/2016 | Al Sayeed et al. | |
| 9,686,176 B2 | 6/2017 | Traxler et al. | |
| 9,819,565 B2 | 11/2017 | Djukic et al. | |
| 9,898,393 B2 * | 2/2018 | Moorthi | G06F 11/368 |
| 10,021,115 B2 * | 7/2018 | Bejarano Ardila | H04L 63/1433 |

(Continued)

FOREIGN PATENT DOCUMENTS

| | | | | |
|---|---|---|---|---|
| CA | 3061638 A1 * | 11/2018 | | G06F 21/00 |
| WO | 2021030170 A1 | 2/2021 | | |

OTHER PUBLICATIONS

Hofmann et al., "Microservices Best Practices for Java", Dec. 7, 2016, Redbooks, Chapters 2-4 (Year: 2016).*

*Primary Examiner* — Davoud A Zand
(74) *Attorney, Agent, or Firm* — Clements Bernard Baratta; Lawrence A. Baratta, Jr.; Christopher L. Bernard (57) ABSTRACT

Systems and methods for managing user confirmation requirements are provided in response to a user entering a command. User confirmation may include an "Are you sure?" prompt or other similar prompts. A system, according to one implementation, is arranged in a distributed microservice system for providing microservices to one or more clients. The system includes a database, a processing device, and a memory device configured to store computer logic having instructions. When executed, the instructions enable the processing device to receive a message from a client regarding a user command to perform an operation with respect to a client device. Also, the processing device is enabled to extract information from the database regarding predetermined confirmation policies pertaining to the operation. The instructions further enable the processing device to analyze potential impact of the operation with respect to the client device to determine user confirmation requirements.

20 Claims, 6 Drawing Sheets

(56) References Cited

U.S. PATENT DOCUMENTS

| | | | |
|---|---|---|---|
| 10,440,128 | B2 | 10/2019 | Miedema |
| 10,680,739 | B2 | 6/2020 | Swinkels et al. |
| 10,715,888 | B2 | 7/2020 | Swinkels et al. |
| 10,735,837 | B1 | 8/2020 | Al Sayeed et al. |
| 10,797,818 | B1 | 10/2020 | Croskery et al. |
| 10,891,176 | B1 | 1/2021 | Miedema |
| 10,958,993 | B2 | 3/2021 | Swinkels et al. |
| 10,972,359 | B2 | 4/2021 | Miedema et al. |
| 10,985,838 | B1 | 4/2021 | Al Sayeed et al. |
| 10,992,374 | B1 | 4/2021 | Miedema et al. |
| 2017/0214701 | A1* | 7/2017 | Hasan .................. H04L 63/145 |
| 2020/0252307 | A1 | 8/2020 | Miedema |
| 2020/0348662 | A1* | 11/2020 | Cella ..................... G06Q 30/02 |
| 2021/0042172 | A1 | 2/2021 | Miedema et al. |
| 2021/0042173 | A1 | 2/2021 | Prakash et al. |
| 2021/0075877 | A1 | 3/2021 | Miedema et al. |

\* cited by examiner

MANAGING CONFIRMATION CRITERIA FOR REQUESTED OPERATIONS IN DISTRIBUTED MICROSERVICE NETWORKS

FIELD OF THE DISCLOSURE

The present disclosure generally relates to distributed microservice networks. More particularly, the present disclosure relates to systems and methods for managing user confirmation requirements in response to user commands to avoid confirmation procedures when the user commands include operations having little or no impact on an associated client.

BACKGROUND OF THE DISCLOSURE

Servers and clients may be connected in a distributed microservice network for communicating data and microservices throughout the network. Some client devices may include or be associated with user interfaces to allow a user (e.g., network administrator, manager, operator, etc.) to enact orchestration and management actions for the client devices.

Often, a user interface associated with a client device may include dialog boxes to allow the user to enter commands and to view responses. Certain user commands may result in changes in how the associated client device operates. The user interfaces, for example, may provide responses or indications to the entered user commands, such as syntax errors, validation that certain actions have been taken, etc. Also, for certain commands or requests, an interface may often ask the user for a "confirmation" that the user indeed wishes to proceed. For example, some confirmation procedures may include prompting the user for a response to the question "Are you sure? (Y/N)." This confirmation is used as a safeguard and allows the user to back out of the command after reconsideration of the possible results or implications of such a command.

Most implementations of various confirmation processing include logic that is coded in the interface itself. The logic requires detailed knowledge of each of the actions and commands associated with a client. However, in a distributed microservice environment, it may be difficult to obtain knowledge of all aspects of a microservice deployment. Also, the interfaces themselves may not have advance knowledge of which operations are "sensitive" (e.g., operations that may have at least some impact on the operations of the client devices). Although some logic may be coded with an understanding of some sensitive operations, it is often insufficient and not updated as needed. Therefore, there is a need in the field of microservice networks to manage "confirmation" processes based on the sensitivity of various operations in a device.

BRIEF SUMMARY OF THE DISCLOSURE

Distributed microservice networks, servers, systems, and methods are described in the present disclosure for managing user confirmation requirements. For example, when a user utilizes a user interface (e.g., Command Line Interface (CLI), web application, etc.), a command may be entered. Typically, the user may receive a prompt such as "Are you sure?" or some other similar type of prompt. However, as described in the present disclosure, various operations associated with the user commands can be analyzed on a service-level to determine when operations may have such an impact on a client device, which is associated with the particular user interface, whereby a user confirmation may be required. However, the server may also perform the service-level procedure of avoiding confirmation to thereby bypass the user confirmation process in the situations where the operations will not have a significant impact on the client device. The server can service multiple clients in this respect such that the respective user interfaces of the client devices do not necessarily need to be aware of the impact of the operations, but instead can leave this responsibility to the servers.

According to one implementation of the present disclosure, a server may be arranged in a distributed microservice system for providing microservices to one or more clients. The server may include a database, a processing device, and a memory device configured to store computer logic having instructions. For example, the instructions, when executed, may be adapted to enable the processing device to receive a message from a client regarding a user command to perform an operation with respect to the client. Furthermore, the instructions may enable the processing device to extract information from the database regarding predetermined confirmation policies pertaining to the operation and then analyze potential impact of the operation with respect to the client to determine user confirmation requirements.

The client, according to some embodiments, may further include an admin interface allowing a user to enter the user command. For example, the admin interface may be unaware of the potential impact of the operation with respect to the client. The admin interface may include one of a Network Configuration Protocol (NETCONF) interface, a Representational State Transfer (REST) interface, and a Command Line Interface (CLI).

The server described above may further be defined whereby the step of analyzing the potential impact may include determining a sensitivity level of the operation. For example, the sensitivity level may be based on one or more of a potential effect that the operation has on traffic flow with respect to the client and a change that the operation has on configuration information of the client. The step of determining the user confirmation requirements may include determining if user confirmation can be bypassed to avoided. Also, the instructions may further enable the processing device to send a message to an admin interface of the client requesting user confirmation when it is determined that the user confirmation cannot be bypassed.

The instructions may further enable the processing device to perform a preliminary account set-up procedure that includes receiving and storing admin information and client information associated with the client. The instructions may further enable the processing device to perform a preliminary confirmation management procedure that includes determining sensitivity levels of operations with respect to multiple clients and determining operations where confirmation processes can be avoided without user involvement based on the operation sensitivity levels.

In some embodiments, the instructions may further enable the processing device to monitor side effects of operations performed with respect to the client, determine sensitivity levels of the side effects, and determine which side effects require user confirmation. In addition, the message described above may be received as part of a validate procedure or commit procedure. Also, the instructions may further enable the processing device to receive a pre-supplied confirmation from an authorized user. According to some embodiments, the client may include or be associated with an admin interface configured to override the procedure of determining user confirmation requirements.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for managing commands that involve operations that may impact one or more client devices in the microservice network system. For example, the commands may be entered by a user (e.g., network operator, network manager, network administrator or "admin," etc.) who may be authorized to request certain commands. Also, the commands may be entered using any suitable type of interface (e.g., User Interface (UI), Graphical User Interface (GUI), Command Line Interface (CLI), web application, etc.).

In particular, the systems and methods may be configured to avoid confirmation to bypass a confirmation process when the commands are associated with operations that do not have a significant impact on the client devices. For example, those operations having little or no impact on clients may be referred to as having "low sensitivity" and those operations having more of an impact on clients may be referred to as having "high sensitivity."

For operations that have a certain high level of sensitivity, confirmation may still be needed by a user. As mentioned above, confirmation may include a step of asking a user "Are you sure?," "Do you wish to continue?," or some other similar questions to allow the user to abandon the initiation of some requested command or operation. For example, after contemplating possible results of a certain action, the user may decide not to commit to such an action. In some embodiments, an interface may be configured to provide an indication of possible results to the user to make sure that the user indeed wishes to continue with the command. For low sensitive commands, the confirmation procedures may be avoided.

As also mentioned above, it can be difficult for a client to have full knowledge of the various operations of a service or microservice offered to the clients in the system, particularly when a service or microservice is newly deployment or when modifications are made to the service or microservice. Also, it may be difficult for each client to have knowledge of the impact (or sensitivity) that every action of the service or microservice may have on the respective client. Therefore, according to the various embodiments of the present disclosure, the burden is shifted to a server providing the service/microservice. Thus, the server can act as a central management entity for determining when operations can be performed automatically and thereby bypassing the confirmation process and when the operations require user confirmation. As mentioned in more detail below, the analysis of when user confirmation is needed may be based on several factors, such as user information (e.g., admin info), client information, combinations of certain users and client devices, and other factors.

Figure 1:
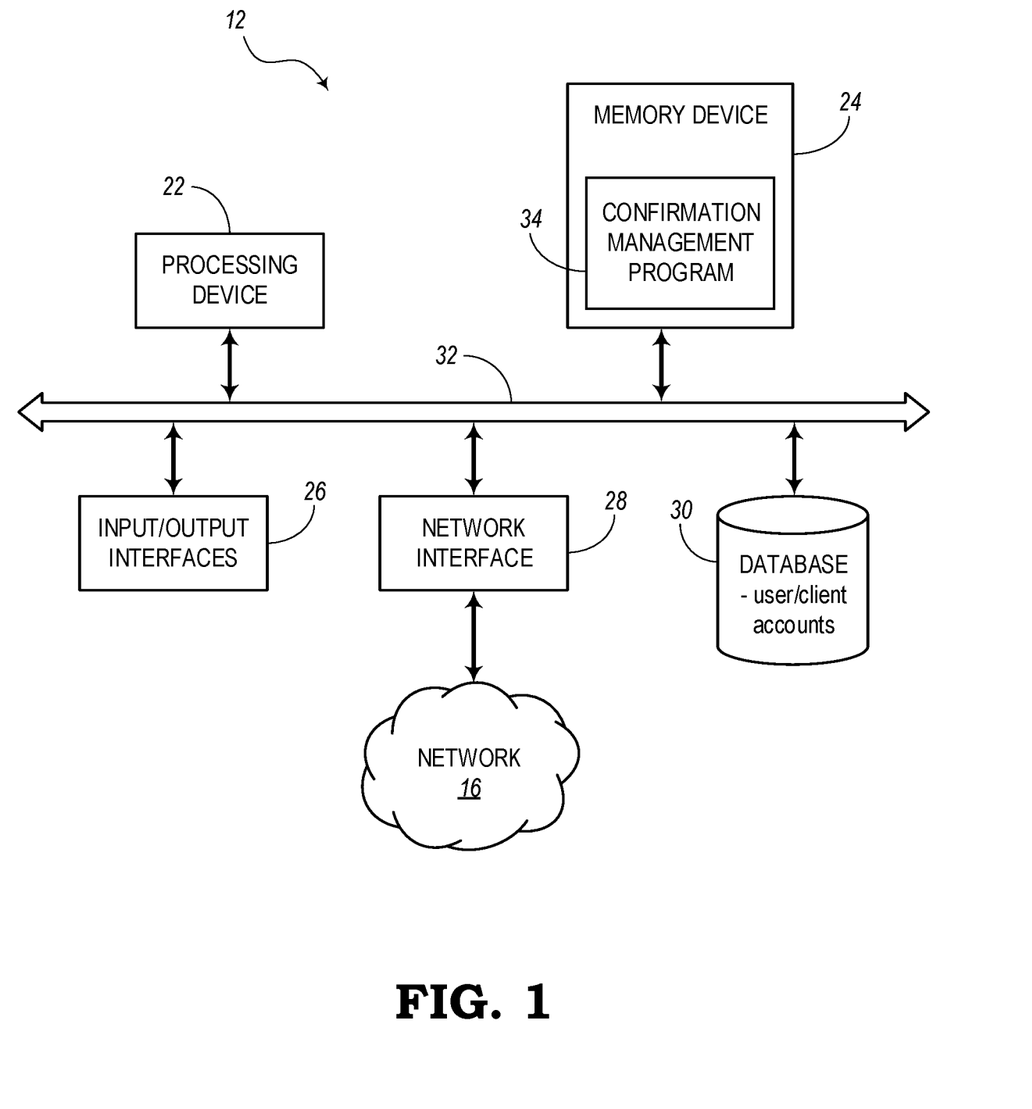
FIG. 1 is a block diagram illustrating a server configured to handle confirmation activities in a distributed microservices architecture, according to various embodiments.

FIG. 1 is a block diagram illustrating an embodiment of a server 12 used in a distributed microservice system. The server 12 is configured to provide services and/or microservices. In this embodiment, the server 12 may also be configured to manage commands to determine whether the command can be initiated with or without admin confirmation. The server 12 in this example includes a processing device 22, a memory device 24, Input/Output (I/O) interfaces 26, a network interface 28, and a database 30. The components 22, 24, 26, 28, 30 may be configured to communicate with each other via a local bus interface 32. As shown in FIG. 1, the server 12 also includes a confirmation management program 34, which may be implemented in software or firmware and stored in the memory device 24 or other non-transitory computer-readable medium. In other embodiments, the confirmation management program 34 may be implemented in hardware (e.g., in an Application Specific Integrated Circuit (ASIC) of the processing device 22). In yet other embodiments, the confirmation management program 34 may be implemented in any combination of hardware, software, and/or firmware.

The confirmation management program 34 may be configured to analyze commands or requests to perform one or more actions or operations on one or more clients 14 that may be configured to operate in the distributed microservice system. The actions or operations may be associated with various services or microservices associated with the server 12. The confirmation management program 34 provides centralized control regarding how commands are handled at each of the clients serviced by the server 12.

During a set-up stage, the network interface 28 is configured to receive information from via the network 16. The processing device 22 may be configured to store this information in the memory device 24 or database 30. For example, in some embodiments, the database 30 may be configured to store the information that defines the users (e.g., admins). Also, the processing device 22 may utilize the confirmation management program 34 to determine various combinations of user information and client information to define how commands are processed and when confirmation is needed. Confirmation requirements may be stored on a user basis with respect to each of a number of admins and/or may be stored on a client basis with respect to each of a number of clients. The confirmation management program 34 may also enable a user level to be computed for each user to determine different confirmation levels, depending on the experience, rank, authorization level, etc. of each user.

Once the initial set-up stage is complete, the server 12 may be configured to understand how to respond to various requests or commands. When a command is received via the network interface 28, the processing device 22 may be configured to determine whether the initiation of certain operations requires an admin confirmation or not.

Figure 3:
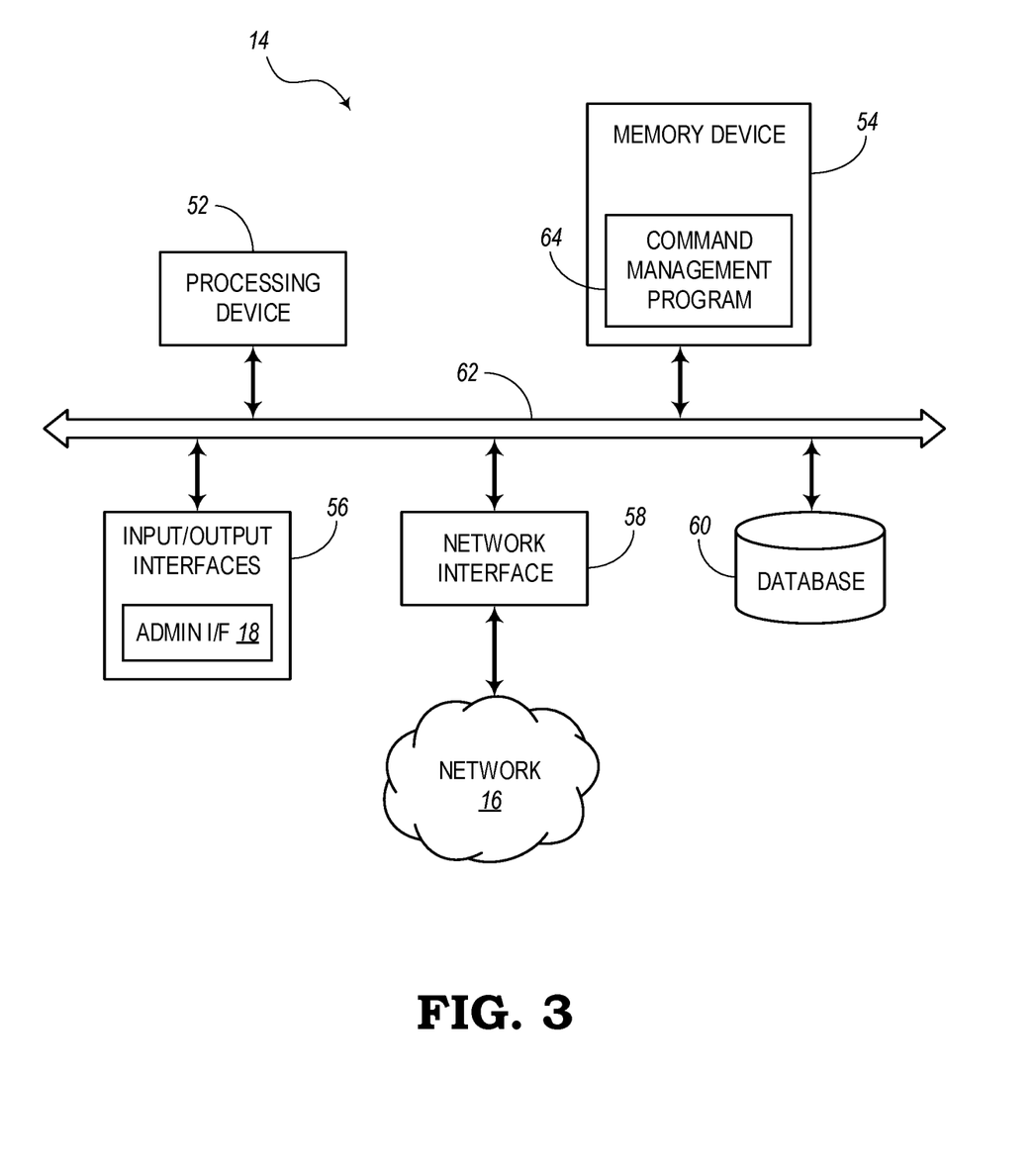
FIG. 3 is a block diagram illustrating a client that can utilize the distributed microservices architecture, according to various embodiments.

In this arrangement, the distributed microservice system allows an admin to enter a command using an admin I/F 18 of Input/Output Interfaces 56 of the client 14. At this point, the command may be considered to be a pending command having pending actions that are not yet enacted until confirmation is obtained. After user confirmation, the operations or actions can then be enacted. The admin I/F 18 is configured to communicate the requested command to the server 12 that is associated with the services or microservices related to the command. Thus, at the server-level, the relevant server 12, having knowledge of the various implications and results of performing certain actions or operations, may be configured to process the command. This server-level analysis of the command may include avoiding the confirmation processes (i.e., no confirmation needed by an admin) when the operations do not have a significant impact on the respective clients. In some cases, the server-level analysis may determine that confirmation of high sensitivity operations may be required by the requesting admin. It should be noted that conventional systems normally perform any confirmation actions at the client level and not on a server level as described herein.

Some implementations of the present disclosure may include configuring one or more servers 12 to enable this centralized determination of whether confirmation is needed. This can be based on the knowledge that the servers 12 may obtain ahead of time to analyze what actions or operations are known to have an effect. For example, in a declarative configuration model, an operation may look as if it may affect traffic-carrying services or sensitive services, but may, in fact, have no effect. With the centralized processing of these command requests, the server 12 can obtain knowledge to allow it to determine if the operation needs to be confirmed. Again, the admin I/F 18 may not have this level of knowledge to understand the possible types of results of applying certain commands.

Furthermore, the server 12 may also be configured to determine one or more "side effects" of performing certain actions or operations as a result of a requested command. For example, actions on may be considered "not sensitive," but, upon obtaining knowledge of real-time results, the server 12 may associate certain commands with certain side effects elsewhere in the distributed microservice system. Confirmation decisions can therefore be made by the servers 12 based on knowledge of these side effects. It should be noted that conventional systems do not include the consideration of such side effects.

In some cases, an admin may enter a command whereby a determination of whether an operation needs confirmation may not be known. Instead, this determination might be such that it can only be made at the server 12 having a more complete knowledge of the services or microservices of the distributed microservice system. The request can be made without knowledge about whether that action will actually be performed. In a declarative model, for example, what looks to be a sensitive operation might actually be a no-op if the configuration of the client 14 (or client device) is already in the requested final state.

Staging of an operation expands the transaction to include additional operations that the admin may not have intended. The server-based confirmation described in the present disclosure addresses these shortcomings of conventional solutions.

Figure 2:
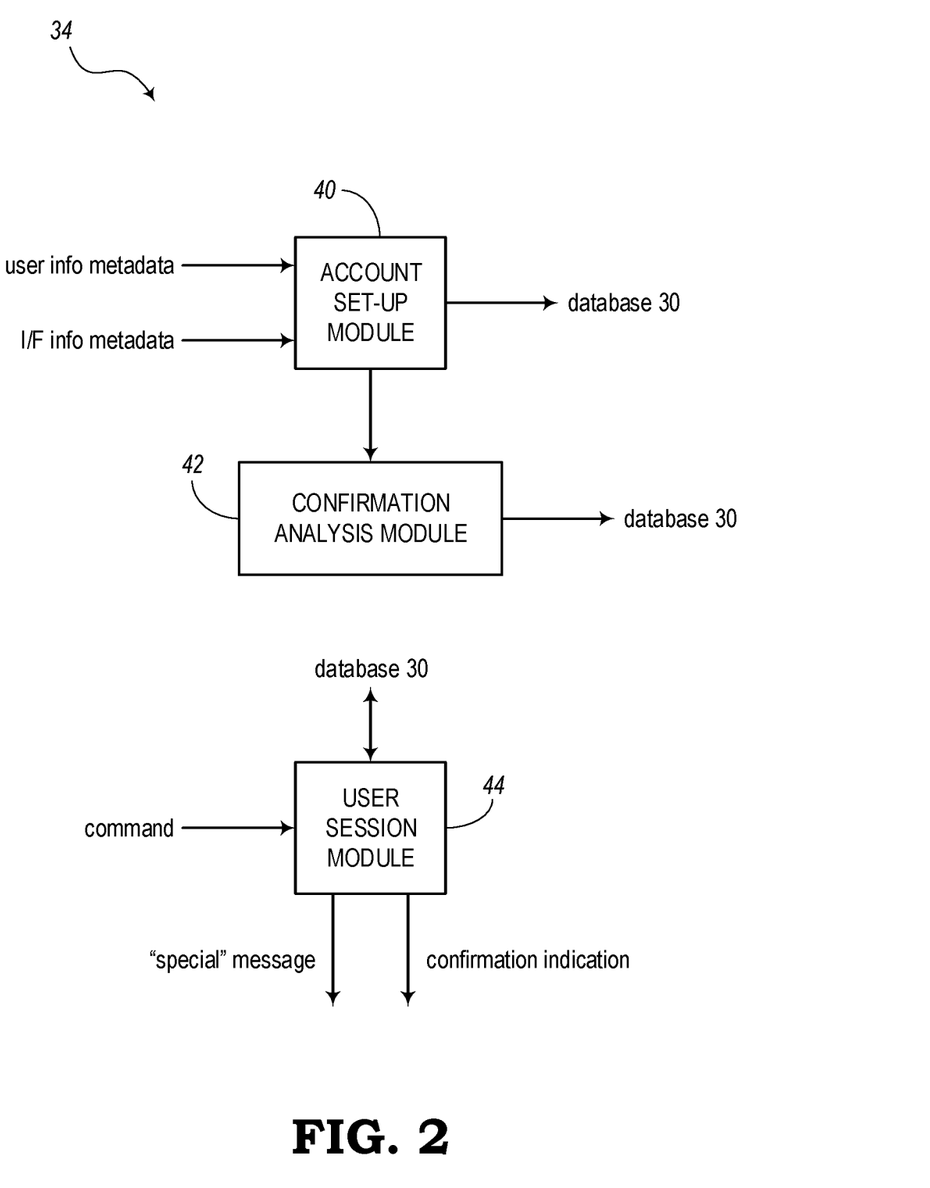
FIG. 2 is a block diagram illustrating various modules defining functions of the confirmation management program shown in FIG. 1, according to various embodiments.

FIG. 2 is a block diagram showing an embodiment of the confirmation management program 34 shown in FIG. 1. In this embodiment, the confirmation management program 34 include a number of modules showing features of the confirmation management program. For example, the confirmation management program 34 may include an account set-up module 40 configured to enable a process for obtain information about the distributed microservice system. The account set-up module 40 may be configured to receive user information metadata and interface (I/F) information metadata performing to a client 14. The account set-up module 40 may be configured to store the user (admin) information and the I/F information in the database 30 shown in FIG. 1.

The received information regarding the users (admins) and interfaces may also be applied to a second module, which is labelled in FIG. 2 as a confirmation analysis module 42. The confirmation analysis module 42 may also be considered to include "set-up" functions for preparing the confirmation management program 34 for operation in the distributed microservice system. The confirmation analysis module 42 is configured to compute confirmation requirements based on user data and I/F data.

The confirmation analysis module 42 may be configured to analyze the user data and I/F data, along with other parameters of the distributed microservice system, to determine when confirmation may be avoided to thereby bypass the usual user confirmation process. This process may also include using real-time data to determine actual results and side effects to determine the sensitivity of certain actions and operations and to learn new associations during operation of the distributed microservice system. The confirmation analysis module 42 may also be configured to determine certain states or conditions where confirmation is appropriate, when admin confirmation would be required, and when further analysis of the distributed microservice system might be needed for determining sensitivity of various operations. The results of the analyses of the confirmation analysis module 42 may also be stored in the database 30 and may include confirmation requirements and various associations between conditions of the distributed microservice system and user and I/F data. The confirmation analysis module 42 is also configured to make logical connections between user information and I/F information to determine various combinations that may be used in the determination of whether confirmation is needed or if it can be avoided. The confirmation analysis module 42 may be configured to store user confirmation information, I/F confirmation information, and combined user/interface confirmation information regarding confirmation requirements associated with users, interfaces, and various combinations thereof.

Also, the confirmation management program 34 of FIG. 2 further includes a user session module 44 that is utilized after the set-up processes related to the account set-up module 40 and the confirmation analysis module 42. In particular, the user session module 44 is configured to operate during real-time operation for processing requests and commands entered by admins and managing user/admin sessions. The user session module 44 is also configured to retrieve information stored in the database 30 as needed.

In response to receiving an indication of a requested command, the user session module 44 is configured to determine if a command includes a sensitive operation (i.e., an operation that would have an impact on traffic through a client or an impact on the configuration information of the client). This process may also include the steps of computing service operations (e.g., staging, declarative actions, etc.) and validating the service operations.

The user session module 42 may be configured to extract the user confirmation information, interface confirmation information, and combined confirmation information from the database 30. Also, the user session module 42 is also configured to determine if confirmation may be needed or if operations can be run without admin confirmation. Thus, it can be determined if confirmation is to be made with or without admin involvement. The user session module 42 also includes determining if confirmation has already been supplied by the admin.

If the user session module 44 determines that confirmation is not needed, then an indication can be sent to the associated client 14 to allow the operation to be performed without the need for further involvement by the user. However, if it is determined that admin confirmation is required or if additional information is needed to make a determination of how the command is confirmed, then the user session module 44 may be configured to send a "special" message to the interface (e.g., admin I/F 18) to get admin confirmation and/or the additional information. In some embodiments, the special message may be transmitted as an error message having a special error code for communicating what additional actions or information may be required from the admin.

FIG. 3 is a block diagram showing an embodiment of the client 14 (or one of multiple clients or client devices serviced by the server 12). In the embodiment shown in FIG. 3, the client 14 includes a processing device 52, memory device 54, I/O interfaces 56, a network interface 58, and a database 60, which may communicate with each other via a local bus interface 62. In some embodiments, the I/O interfaces 56 may include one or more user interfaces (e.g., admin I/Fs 18) for allowing an admin to enter commands, confirm the commands as desired, etc. Also, according to some embodiments, the database 60 may be configured to store information regarding network operations that require admin confirmation. Also, the confirmation requirements stored in the database 30 of the server 12 shown in FIG. 1 may also be stored in the database 60.

The client 14 may also include a command management program 64 configured to handle new commands that are to be enacted in the client 14 and configured to check confirmation criteria during a validation action or a commit action. The new commands may be received from an admin or may be created as a result of other operations existing in the distributed microservice system. Again, as described in the present disclosure, the commands may include one or more actions or operations that are intended to be executed on the client 14. Also, the actions or operations may be defined according to various sensitivity levels based on the level of impact that the actions or operations may have on the client 14. For example, an action or operation may be defined as having some level of impact if the result of the action or operation includes a modification of the configuration (or configuration file) associated with the client and/or a modification of data traffic through the client.

In real-time operation, the command management program 64 may be override confirmation criteria set by the server 12, such as when certain information is known at the respective client 14 and may not be known at the server 12. This override functionality may preferably be configured with more restrictive confirmation procedures, thereby requiring local admin confirmation for certain operations that may not be known by the server 12 to be sensitive. Also, the override functionality may also include pre-confirmation actions for allowing an admin to pre-confirm certain actions to simplify command requests.

The execution of the command management program 64 may further include certain steps for detecting confirmation scenarios. An admin I/F (e.g., I/O interface 56) may be configured to allow an admin to log on and enter details about himself or herself, which may be stored as user information in databases 30, 60. The admin can also enter details of the client 14 (and/or admin I/F 18) as well. The command management program 64 can also include providing pre-confirmation for certain actions based on local sensitivity criteria. These actions may be part of various set-up steps for preparing the distributed microservice system for handling confirmation procedures.

During operation of the distributed microservice system, commands may be processed to determine confirmation procedures. In response to the server 12 determining that confirmation is required of the admin and that confirmation has not yet been supplied, a message (e.g., error message, special message), as described above, may be provided from the server 12 to the client 14 (e.g., admin I/F 18). When such a message is received, the admin I/F of the client 14 may be configured to display a user visible message, such as "Confirmation needed," "Are you sure? (Y/N)," etc. in a window of the interface. In some embodiments, the admin I/F may also be configured to display an informative explanation that the server requires confirmation for the command or even an informative explanation of side effects that may result from execution of the command and/or how the side effects could affect traffic flow or configuration information of the client 14.

Figure 4:
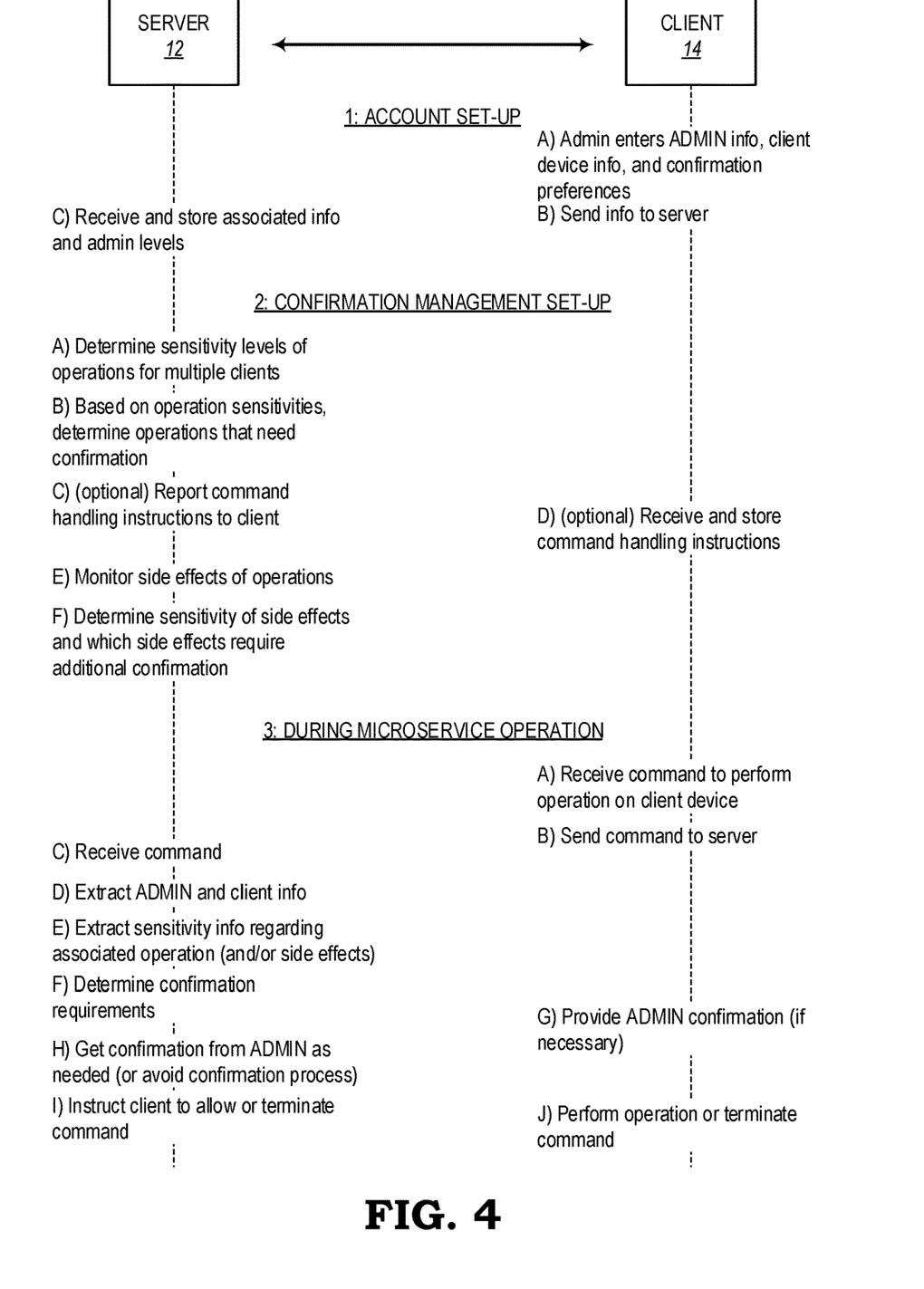
FIG. 4 is a diagram illustrating actions performed by a server and a client in a microservice environment for handling confirmation activities, according to various embodiments.

It will be appreciated that some embodiments described with respect to FIGS. 2 and 4 may include or utilize one or more generic or specialized processors ("one or more processors") such as microprocessors; Central Processing Units (CPUs); Digital Signal Processors (DSPs); customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments of FIGS. 1 and 3 may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Therefore, the operating principles of the systems and methods described in the present disclosure may include the provision of logic for analyzing and processing commands and operations that need to be confirmed. The main aspects of this analyzing and processing may be the responsibility of the servers 12 themselves and therefore the logic may be owned by the service providers.

Also, the test for confirmation may be performed after the request has been staged (expanded) to include side effects. The test for confirmation can be done in the context of declarative configuration requests, for example, where additional admin confirmation may not be needed if there is no change to the configuration information in this case. Also, the test for confirmation can be overridden by the client 14 itself (or at the admin I/F) or by an admin (or customer) under certain conditions, such as when more knowledge of local impact may be available to the clients rather than the server.

One of the goals of the present disclosure is to provide a way for generic interfaces (e.g., admin I/Fs 18, I/O interfaces 56, etc.) in a distributed microservice environment to obtain confirmation from the admin/client for operations that are sensitive. As disclosed herein, this can be done without the interfaces having knowledge of the models or the nature of the sensitivity and when operations may need to be confirmed with appropriate confirmation supplied by the admin.

Although admins and other users usually appreciate the feature of being blocked from accidentally performing operations that can affect traffic or other sensitive aspects of a client and receiving a confirmation request of "Are you sure?" or other similar request, the systems and methods allow centralized recognition of various operations that do not impact clients and do not have any side effects. As such, the confirmation process may be avoided on a broad service-level scope and may be changed as services, microservices, networks, distributed microservice systems, etc. are deployed, repaired, modified, etc.

For distributed and dynamic microservice-based deployments, the admin interfaces may not have any knowledge of the operations that require confirmation. Even with this knowledge, it may be difficult on the scale of an entire distributed microservice system to coordinate the client 14 to share this knowledge. Also, with so many clients in a system, it may be difficult to replicate the confirmation analysis knowledge with each client and interface.

The embodiments described in the present disclosure provide the ability for the servers themselves (and related services and microservices) to validate the requested operations based on the need to confirm and detecting that confirmation. This may be done as part of a validation step or commit step with knowledge at the server if the operation needs to be confirmed and if the confirmation has been supplied. In addition, some client devices may be primarily driven by computers without an admin I/F 18 and would not need this confirmation validation. In this respect, the client 14 could be configured in a way where it would be unable to receive confirmation from the interfaces and/or admins.

The system (including the server 12 and client 14) may include a first process of determining the type of interface associated with receiving commands with respect to a set of operations. This process includes determining if the interface is a machine interface that works automatically without user input. With a machine interface, the server 12 can recognize the interface as not needing user confirmation for various commands and therefore does not require confirmation for this device. However, if the interface is associated with a user device where a user may enter commands to perform operations, the server 12 may recognize the device as potentially requiring confirmation and may further be configured to analyze the system to determine if confirmation may be needed. In addition to eliminating machine interfaces from the list of devices that may require confirmation, the system can also base this initial elimination process on who the various users are. For example, some users referred to as "super-users" may be allowed to perform actions without any confirmation needed, whereas a common administrator (or others having lower authorization privileges or users that are not given a certain level of trust) may require confirmation for their requested actions.

As second groups of steps associated with the system may include determining the sensitivity of certain operations (for devices having user interfaces, and not for devices having automatic or machine interfaces). The system may determine that some operations may need user confirmation, while others do. For example, the server may have a better overall understanding of the various components in a network and can more effectively determine sensitivity. Also, the server within the system may obtain knowledge of changes to certain operations and make changes to sensitivity as needed. For example, if one operation is changed to include a dependence on another operation, which happens to have a different sensitivity than the first, then the sensitivity of the operation may be changed to match this sensitivity.

Next, the server may be configured to cause the client 14 to add confirmation software or processes (e.g., dialog box techniques, etc.) to replicate commonality among the various client devices throughout the system. Also, the server may be configured to instruct the client 14 to avoid confirmation processes if it is determined that certain operation do not require confirmation (e.g., less sensitive) or no longer require confirmation.

Furthermore, when it is determined that confirmation is needed for certain operations, then the system can function normally. During operation, however, the system may detect the situations where confirmation is needed and wait for user confirmation. The server can also log information about which operations need confirmation and when the user actually confirms the operation. The logs may be stored in the database 30.

In a sense, the action of "sensitive declaration" can be considered as being moved from the client 14 to the server 12 so that the server 12 can manage this responsibility. By allowing the server 12 to handle this for multiple clients, the confirmation software code can be reduced throughout the system. Also, the system can run more consistently and more intelligently with one strategy for confirmation since the server 12 can have a better idea of the entire system and whether or not certain operations are considered to be sensitive.

FIG. 4 is a diagram illustrating functions that may performed by a server 12 and a corresponding client 14, according to various embodiments. As shown in FIG. 4, three processes may be performed. A first process may include an account set-up where account information is obtained. A second process may include a confirmation management set-up where confirmation conditions are predetermined. A third process may include a real-time process that can be executed during the actual operation of a microservice system. As shown, some steps are executed at the client 14 (e.g., sometimes in association with actions by an admin) and some steps are executed at the server 12. It should be understood that changes in these functions can be made without departing from the spirit and scope of the present disclosure.

In some embodiments, the account set-up process may include A) the admin enters ADMIN information, client information, and confirmation preferences. Then, B), the client 14 send this information to the server. In step C), the account set-up includes the server receiving and storing the ADMIN and NE information of the associated client, and may also include storing an admin level that may be indicative of an authorization level of the admin.

The confirmation management set-up process may include A) the server determining sensitivity levels of operations for multiple clients based on analysis of how certain operations with respect to the services/microservices impact or affect the operating client or other clients in the system. In step B), the server, based on operation sensitivities, may be configured to determine operations that can categorized as having low (or no) sensitivity, whereby the operations can thus bypass the confirmation process without further admin involvement. Step C, which may be optional in some embodiments, includes reporting the command handling instructions to the clients associated with the specific services and microservices provided to the clients. Also, optional step D includes receiving and storing the command handling instructions at the client, which allows, in some embodiments, the clients themselves to handle the processing of confirmation strategies.

In addition, the confirmation management set-up process also includes step E, where the server monitors the side effects of the operations. This may include storing historical data based on how clients react to certain operations. Step F includes determining, at the server, the sensitivity of the side effects and determining which side effects may themselves require additional confirmation. For example, some operations may include multiple side effects, where one or more side effects might have little or no impact on one or more clients (e.g., traffic and config information) and one or more side effects might have a more significant impact on one or more clients. In this case, the non-sensitive side effects can be determined as not needing confirmation, while the more significant, sensitive side effects may each require individual admin confirmation.

Also shown in FIG. 4 is the group of steps for performing the process executed during the microservice system operation. Step A include receiving, at the client, a command to perform an operation with respect to the client. Step B includes sending the command to the server. In response, the server includes step C of receiving the command. Then, the server includes extracting the ADMIN and NE information (step D) and extracting sensitivity information regarding associated operation (and/or side effects) (step E). From this extracted data, the server is configured to determine confirmation requirements (step F).

If it is determined that confirmation is necessary at this point, the client (step G) is configured to obtain ADMIN confirmation and provide this to the server. The server is configured (step H) to get confirmation (e.g., ADMIN confirmation) from the client or to avoid confirmation processing (when admin confirmation is not needed). The server may then instruct the client to either allow or terminate the command (step I). In response, the client includes performing the operations associated with the command or terminating the command (step J).

The systems and methods of the present disclosure may include other processes. According to one implementation, a process may include:

a) Inserting metadata in a messaging layer that can be forwarded to all microservices or clients;

b) Adding metadata to a user account and/or adding a user level associated with a user account indicating that confirmation is required for a specific user;

c) Adding metadata to an interface account (or client account) indicating that confirmation is required for this interface or client. For example, confirmation strategies for different types of interfaces may include:

i) avoiding confirmation processes for Network Configuration Protocol (NETCONF) interface, without a requirement for user confirmation,     ii) performing confirmation processes for Representational State Transfer (REST) interface if command is coming from a Swagger page requiring user confirmation,     iii) avoiding confirmation processes for REST interface if command is not coming from a Swagger page, without a requirement for user confirmation, and     iv) performing confirmation processes for Command Line Interfaces (CLIs) requiring user confirmation;

d) Performing management of a user session (e.g., user session module 44) by extracting the interface confirmation requirements and the user confirmation requirements, combining them, and determine an action with respect to confirmation (determine if admin confirmation is needed or if the confirmation process can be avoided);

e) Receiving a confirmation from an admin/client and inserting this confirmation as metadata to a message;

f) Extracting this metadata by a server when a sensitive operation is being validated or committed;

g) Providing a special message (e.g., error message, error code, "Are you sure? (Y/N)" message, etc.) when confirmation is required but has not yet been supplied; and h) Displaying the special message related to confirmation requirement in the interface, getting confirmation for the action/operation, and resubmitting the confirmation to the server for validation or commitment.

Another embodiment of a confirmation management process may include the steps of:

1. Enable user/admin to log into interface,
2. Obtain user/admin details (to determine user confirmation requirements),
3. Obtain interface/NE details (to determine interface/NE confirmation requirements),
4. Compute confirmation requirement from user/admin confirmation requirements and interface/NE confirmation requirements,
5. Issue command at interface (by user/admin)
6. Send command to service framework (or server) with the confirmation requirements (if server does not include updated confirmation requirements),
7. Compute service operations (e.g., staging, declarative diff, etc.),
8. Validate service operations (with respect to sensitivities),
9. Determine by server if the operations are sensitive, prepare for rejection of command if confirmation is required but not yet received, and provide user visible message to interface with special message or error code, 10. Detect by interface the special message or error code, display user visible message, and ask for user/admin confirmation, 11. Supply confirmation from interface (upon user/admin confirmation) to server to re-issue command with the confirmation, or, if no confirmation received, terminate command, and 12. Determine if the operation is sensitive and allow the operation if confirmation has been supplied.

Figure 5:
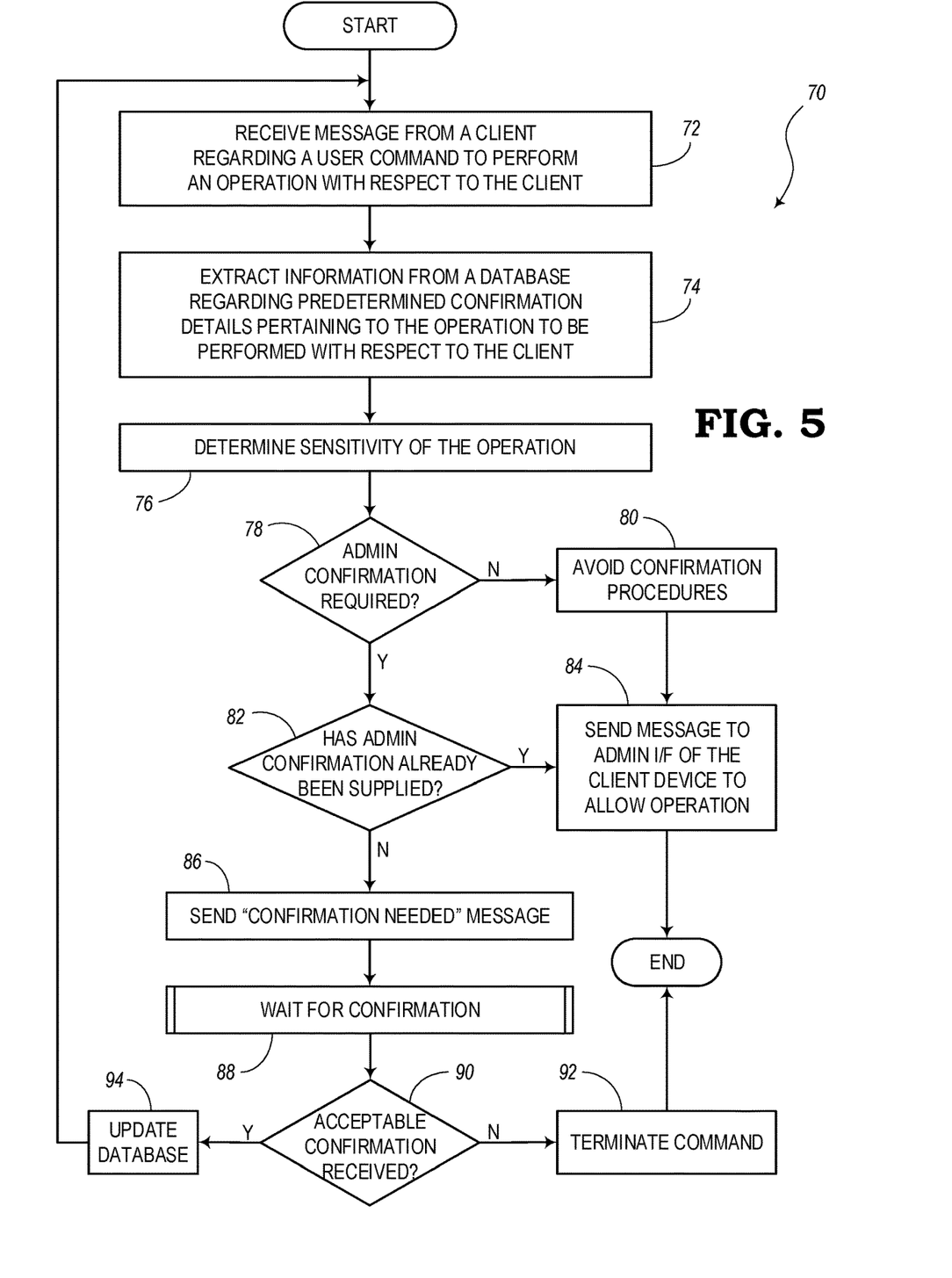
FIG. 5 is a flow diagram illustrating a process for managing confirmations for operations to be performed in a client arranged in a microservice system, according to various embodiments.

FIG. 5 is a flow diagram showing an embodiment of a process 70 for managing service confirmations in a network. In this embodiment, the process 70 includes the step of receiving a message from a client regarding a command to perform an operation on the client, as indicated in block 72. The process 70 also includes the step of extracting information from a database regarding predetermined confirmation details pertaining to the operation to be performed on the client, as indicated in block 74. Also, the process 70 includes determining the sensitivity of the operation, as indicated in block 76. The sensitivity, in this respect, may refer to the level of impact that a command may have on a client, such as the impact of changing configuration information of the client or changing traffic flow patterns with respect to the client.

As shown in FIG. 5, the process 70 further includes the step of determining if an admin confirmation is required, as indicated in decision diamond 78. If admin confirmation is not required, the process 70 proceeds to block 80. Otherwise, if admin confirmation is required, the process 70 proceeds to decision diamond 82. Block 80 includes the step of avoiding the confirmation procedures and the process 70 proceeds to block 84. In decision diamond 82, the process 70 includes the step of determining if an admin confirmation has already been supplied. If the admin confirmation has already been supplied, then the process goes to block 84. Block 84 includes the step of sending a message to the client to allow the operation. The process 70 may be configured to end at this point.

If it is determined in decision diamond 82 that the admin confirmation has not already been supplied, the process 70 proceeds to block 86. As indicated in block 86, the process 70 includes the step of sending a "confirmation needed" message from the server to the client. Then, the process 70 includes waiting for the confirmation, as indicated in block 88. After a certain time, the process 70 includes determining if confirmation has been received, as indicated in decision diamond 90. If no confirmation is received within a certain time, the command may be terminated, as indicated in block 92. If it is determined in decision diamond 90 that the confirmation has been received, then the process 70 includes the step of updating the database (as needed), as indicated in block 94. Then, the process 70 returns back to block 72 to repeat the process as needed for managing confirmation conditions.

Figure 6:
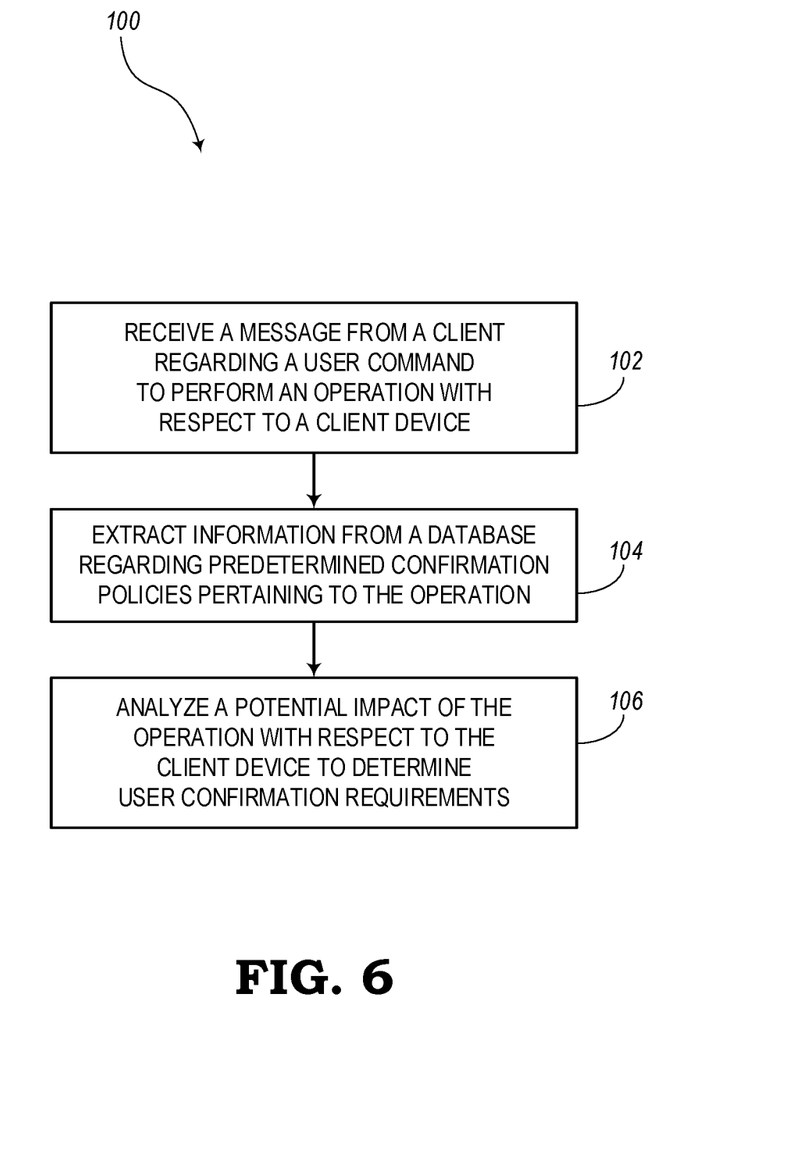
FIG. 6 is a flow diagram illustrating a general process for managing confirmations in a microservice environment, according to various embodiments.

FIG. 6 is a flow diagram showing an embodiment of a general process 100 for managing confirmations in a microservice environment. In this embodiment, the process 100 include receiving a message from a client regarding a user command to perform an operation with respect to the client, as indicated in block 102. The process 100 also includes extracting information from a database regarding predetermined confirmation policies pertaining to the operation, as indicated in block 104. Also, the process 100 includes analyzing any potential impact of the operation with respect to the client to determine user confirmation requirements, as indicated in block 106.

According to the various embodiments of the present disclosure, the systems and methods described herein may include a number of differences with respect to conventional confirmation systems that are normally executed only on the user interface level. Instead, the present systems and methods are configured to give the responsibility of managing user confirmation procedures to the servers that provide microservices to the clients.

The present disclosure includes systems and methods that allow the logic of the confirmed actions to be centralized with the services themselves. However, in some cases, the interfaces may be configured to override the need for confirmation. Also, the present disclosure allows the confirmation to be checked during both validation operations and commit operations.

In addition, the present disclosure also describes other points of novelty, such as allowing a user/admin/client to pre-confirm (e.g., sudo) an operation by supplying the confirmation in advance. Also, the present disclosure may allow confirmation to be bypassed for operations that have little or no effect on the corresponding client(s). For example, a replace operation to replace config information on a client may not really modify the config in a significant way and therefore should not necessarily need confirmation from the user/admin/client. Furthermore, as described above, the systems and methods may include monitoring side effects of an operation and specifically determining for each side effect whether it need user confirmation or not, even when the initial operation/action may not need confirmation itself.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A system for providing microservices to one or more clients, the system comprising:
   a database;
   a processing device; and
   a memory device configured to store computer logic having instructions that, when executed, enable the processing device to
      receive a message from a client regarding a user command to perform an operation, on any of the microservices, with respect to a client device,
      extract information from the database regarding predetermined confirmation policies pertaining to the operation,
      analyze potential impact of the operation, after operation is staged, with respect to the client device to determine user confirmation requirements,
      responsive to no user confirmation requirements, perform the operation, and
      responsive to user confirmation requirements, ask for confirmation and perform the operation responsive to the confirmation.

2. The system of claim 1, wherein the client includes an admin interface allowing a user to enter the user command, the admin interface being unaware of the potential impact of the operation with respect to the client.

3. The system of claim 2, wherein the admin interface includes one of a Network Configuration Protocol (NETCONF) interface, a Representational State Transfer (REST) interface, and a Command Line Interface (CLI).

4. The system of claim 1, wherein analyzing the potential impact includes determining a sensitivity level of the operation, the sensitivity level being based on one or more of a potential effect that the operation has on traffic flow with respect to the client and a change that the operation has on configuration information of the client.

5. The system of claim 1, wherein determining the user confirmation requirements includes determining if user confirmation can be bypassed.

6. The system of claim 5, wherein the instructions further enable the processing device to send a message to an admin interface of the client requesting user confirmation when it is determined that the user confirmation cannot be bypassed.

7. The system of claim 1, wherein the instructions further enable the processing device to perform a preliminary account set-up procedure that includes receiving and storing admin information and client information associated with the client.

8. The system of claim 1, wherein the instructions further enable the processing device to perform a preliminary confirmation management procedure that includes:
   determining sensitivity levels of operations with respect to multiple clients; and
   determining operations to be executed without user involvement based on the operation sensitivity levels.

9. The system of claim 1, wherein the instructions further enable the processing device to:
   monitor side effects of operations performed with respect to the client,
   determine sensitivity levels of the side effects, and
   determine which side effects require user confirmation.

10. The system of claim 1, wherein the message is received as part of a validate procedure or commit procedure.

11. The system of claim 1, wherein the instructions further enable the processing device to receive a pre-supplied confirmation from an authorized user.

12. The system of claim 1, wherein the client includes an admin interface configured to override the procedure of determining user confirmation requirements.

13. A method comprising the steps of:
   receiving a message from a client regarding a user command to perform an operation, on any of the microservices, with respect to a client device;
   extracting information from a database regarding predetermined confirmation policies pertaining to the operation;
   analyzing potential impact of the operation, after operation is staged, with respect to the client device to determine user confirmation requirements;
   responsive to no user confirmation requirements, performing the operation; and
   responsive to user confirmation requirements, asking for confirmation and performing the operation responsive to the confirmation.

14. The method of claim 13, wherein the step of analyzing the potential impact includes the step of determining a sensitivity level of the operation, the sensitivity level being based on one or more of a potential effect that the operation has on traffic flow with respect to the client and a potential effect that the operation has on configuration information of the client.

15. The method of claim 13, wherein determining the user confirmation requirements includes determining if user confirmation can be bypassed.

16. The method of claim 15, further comprising the step of sending a message requesting user confirmation to an admin interface of the client when it is determined that the user confirmation cannot be bypassed.

17. A non-transitory computer-readable medium configured to store computer logic having instructions that enable one or more processing devices to:
   receive a message from a client regarding a user command to perform an operation, on any of the microservices, with respect to a client device;
   extract information from a database regarding predetermined confirmation policies pertaining to the operation;
   analyze potential impact of the operation, after operation is staged, with respect to the client device to determine user confirmation requirements;
   responsive to no user confirmation requirements, performing the operation; and
   responsive to user confirmation requirements, asking for confirmation and performing the operation responsive to the confirmation.

18. The non-transitory computer-readable medium of claim 17, wherein the instructions further enable the one or more processing devices to perform a preliminary account set-up procedure including the steps of receiving and storing admin information and client information associated with the client.

19. The non-transitory computer-readable medium of claim 17, wherein the instructions further enable the one or more processing devices to perform a preliminary confirmation management set-up procedure including the steps of:
   determining sensitivity levels of operations with respect to multiple clients; and
   determining operations to be executed without user involvement based on the operation sensitivity levels.

20. The non-transitory computer-readable medium of claim 17, wherein the instructions further enable the one or more processing devices to:
   monitor side effects of operations performed with respect to the client;
   determine sensitivity levels of the side effects; and
   determine which side effects require user confirmation.

* * * * *